United States Patent [19]

Hubertson

[11] 4,254,937
[45] Mar. 10, 1981

[54] BUTTERFLY VALVE

[75] Inventor: Folke H. Hubertson, Säffle, Sweden

[73] Assignee: Aktiebolaget Somas Ventiler, Säffle, Sweden

[21] Appl. No.: 30,860

[22] Filed: Apr. 17, 1979

[30] Foreign Application Priority Data

Nov. 17, 1978 [SE] Sweden .................................. 7811864

[51] Int. Cl.³ .................................................. F16K 1/22
[52] U.S. Cl. ......................................... 251/305; 251/306
[58] Field of Search ..................................... 251/305, 306

[56] References Cited
U.S. PATENT DOCUMENTS

| 3,442,488 | 5/1969 | Adams ...................................... 251/305 |
| 3,565,394 | 2/1971 | Smith ........................................ 251/306 |
| 3,698,686 | 10/1972 | Williams ................................. 251/306 |
| 3,809,361 | 5/1974 | Pfundstein et al. ..................... 251/305 |
| 3,963,213 | 6/1976 | Brattberg ................................. 251/306 |
| 4,037,819 | 7/1977 | Kindersley ............................... 251/305 |
| 4,058,290 | 11/1977 | Nelimarkka .............................. 251/306 |
| 4,175,578 | 11/1979 | Priese ........................................ 251/306 |

FOREIGN PATENT DOCUMENTS 2653804 6/1977 Fed. Rep. of Germany .......... 251/306

Primary Examiner—William R. Cline
Assistant Examiner—H. Jay Spiegel
Attorney, Agent, or Firm—Murray and Whisenhunt

[57] ABSTRACT

A butterfly valve with a seal face (4) having two opposite, essentially spherical sections (h, i) intersected by a symmetry plane (k) through the throttle which coincides with the torsional axis (j) of the throttle and two opposite, essentially conical sections (f, g) on both sides of the symmetry plane. The spherical and the conical sections successively merge into each other. When the throttle is revolved, the conical surfaces are pressed against a valve seat (18) shaped as a circular ring made of steel. This seat then assumes a more and more elliptical shape finally to adjust itself entirely to the elliptical mean line of the seal face.

6 Claims, 4 Drawing Figures

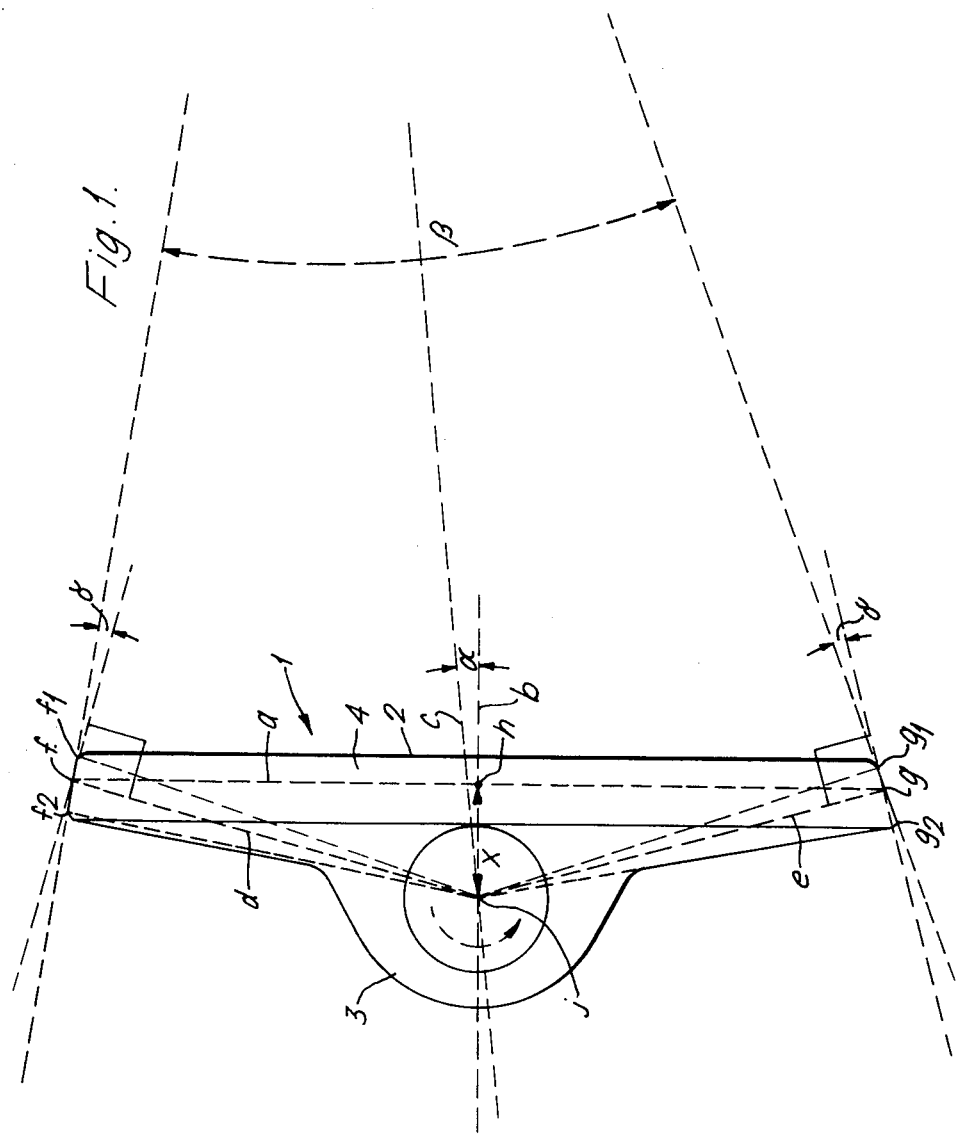

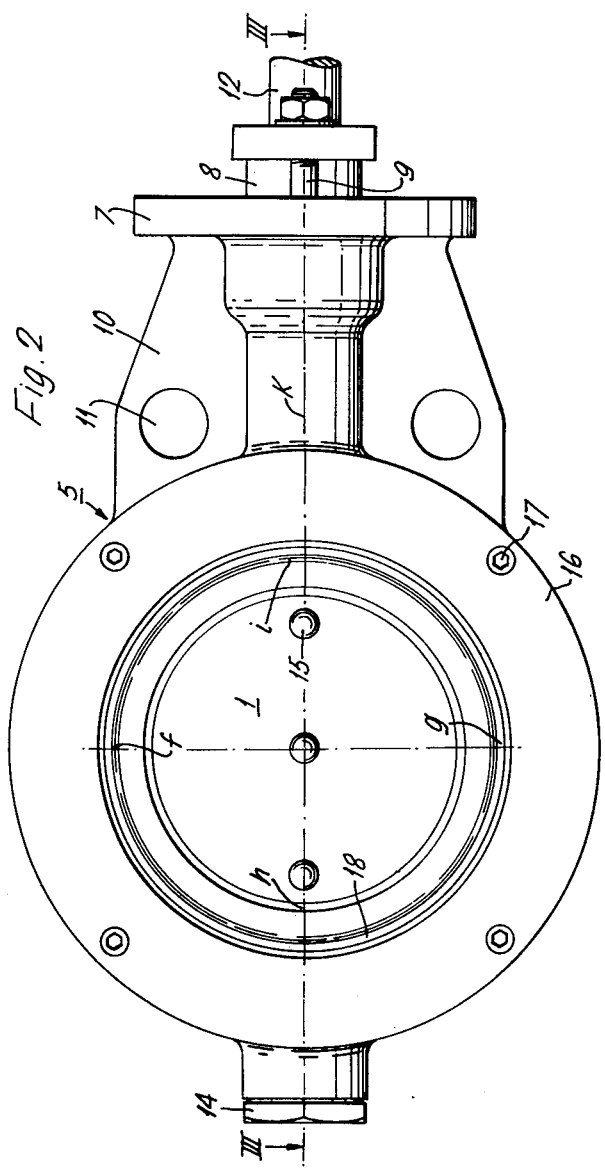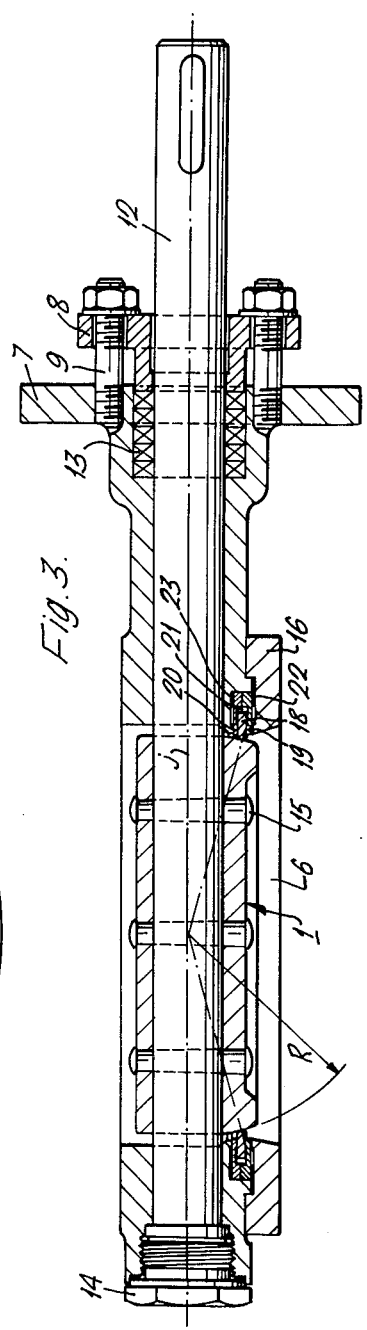

BUTTERFLY VALVE

TECHNICAL FIELD

The invention refers to a butterfly valve embodying a valve housing with a valve seat and a throttle arranged so as to revolve around a shaft going through the valve housing, between an open position and a shut-off position in which a seal face of the throttle is pressed against the seat in the valve housing.

BACKGROUND ART

The butterfly valves in existence today are usually built on the principle of soft gaskets. A very frequent valve type is illustrated in e.g. the Swedish patent specification 199 078. With this valve type the whole of the valve housing is lined with a soft material, e.g. rubber or other polymer. A frequent thing is also to manufacture just the valve seat itself from a soft material. Examples of this valve type are illustrated in the Swedish patent specifications Nos. 175 149 and 178 131. There are also cases of the soft sealing element being instead placed on the sealing face of the throttle. Examples of this principle are shown in the Swedish patent specification No. 195 072 and the German patent specifications Nos. 1 011 683 and 1 232 422. A disadvantage of soft sealing elements in butterfly valves is that their resistance to high-temperature media is often low. It is true that the insensitiveness of synthetic rubber and certain other polymers to high temperatures has gradually improved, but still these kinds of material cannot in any way compare favourably with the resistance to high temperatures of steels and other metals and alloys. The same thing also applies to the resistance to certain chemically aggressive media. In these cases, too, the properties of high-alloyed stainless steels and other alloys are quite superior to those of soft materials of rubber type. These circumstances are of course well-known, and many a trial has been made with replacing the soft sealing elements by metallic ones. In these cases, however, the sealing has not been to satisfaction or has the sealing device and/or the equipment parts belonging to it become so complicated that this valve type has not got any practical importance so far. An example of a valve belonging to this category is shown in the Swedish patent specification No. 193,923.

DISCLOSURE OF INVENTION

The main object of the present invention is to provide a butterfly valve having good sealing capacity and not implying soft sealing element made of rubber, plastic or similar materials. More specifically an object is to produce a valve having good sealing capacity and which can be entirely manufactured of metal. An object of the present invention is, however, that the principles of the invention shall not exclude the use of such soft materials as e.g. PTFE and nylon. There is rather an object that such materials will also have to be used, e.g. in valve seats, if for some reason or other these are more suitable or otherwise more desirable than metallic materials. In other words, a purpose of the present invention is to create liberty of choice between different materials in regard to their convenience for the medium which the valve is intended to operate with.

Another object is to provide a valve the throttle of which when being turned from its shut-off to its open position and vice versa is not principally in contact with the valve seat, which is favourable from a wear point of view.

An object of this invention is also to provide a butterfly valve being sturdy and reliable, simple to operate and having a long life.

These and other objects can be attained by the seal face of the swivel throttle having two opposite, essentially spherical sections intersected by a symmetry plane through the throttle, which plane coincides with the swivel stem of the throttle and two opposite, essentially conically shaped sections on both sides of the aforementioned symmetry plane between the two essentially spherically shaped sections, and by the fact that the essentially spherically and the essentially conically shaped sections successively merge into each other.

Moreover, according to the invention, the pivot shaft of the conically shaped faces is placed at a slight angle to a shaft coinciding with the above-mentioned symmetry plane and is perpendicular to the pivot shaft of the damper. The angle may vary according to the angle between the pivot shaft and the generating line and is also determined by the dimensions of the throttle, like its diameter and the width of the seal face. In the normal case the angle should be between 5° and 8°. At the same time it is suitable that the angle between the conical sections, i.e. the top rake of the cone, amounts to between 10° and 40°, at which the optimal angle is determined. According to the invention the seat is arranged to be flexible in its plane so that, when the essentially conically shaped faces are being pressed against it, the seat can concur with the shape of the curve going around the circumference of the seal face at the level determined by the contact points between seal face and valve seat. According to the invention the curve mentioned before essentially consists of an elliptic curve, the major axis of which coincides with the symmetry plane of the throttle. In the open position of the valve the seat has furthermore a preferably circular shape. This implies that the seat is flexible at the level of the seat so that it can be drawn out by the conical faces in the direction of the major axis and at the same time be compressed in the direction of the minor axis maintaining an essentially constant circumference. The valve seat is then suitably arranged displaceable in an annular groove in the valve housing. According to the best mode of carrying out the invention the annular groove is formed by a couple of spring washers which are for sealing reasons pressed to both sides of the valve seat ring.

Further objects and advantages as well as characteristics of the invention will appear from the following description of the best mode of carrying out the invention.

BRIEF DESCRIPTION OF DRAWINGS

In the following description of the best mode of carrying out the invention reference will be made to the drawing figures.

FIG. 1 illustrates the geometrical conditions at the throttle contained in the valve.

FIG. 2 shows a planar view of the butterfly valve according to the best mode of carrying out the invention.

FIG. 3 constitutes a section III—III of FIG. 2, and

BEST MODE OF CARRYING OUT THE INVENTION

Figure 4:
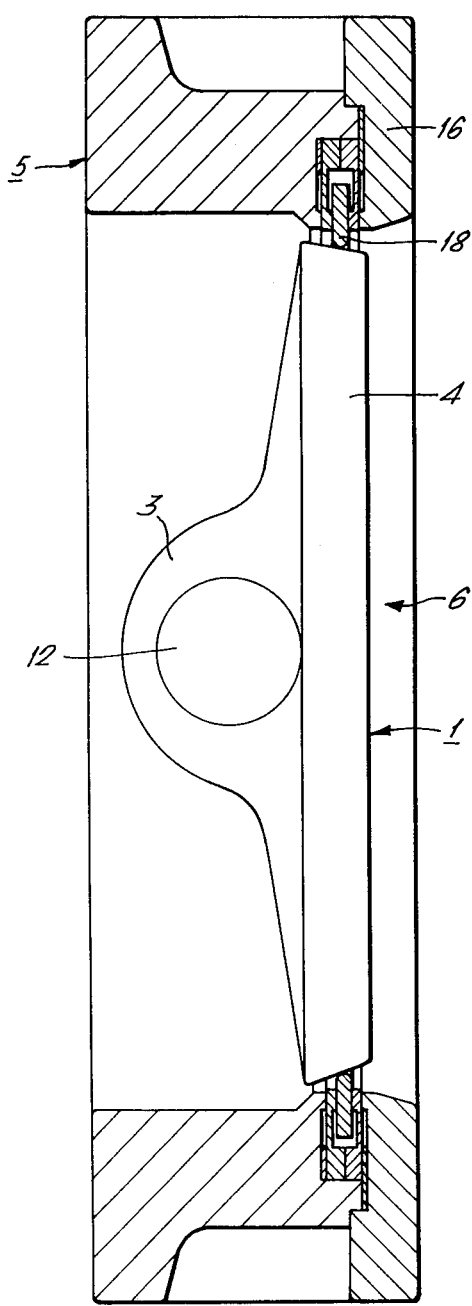
FIG. 4 constitutes a section IV—IV of FIG. 2.

Reference is first being made to FIG. 1 that shows a lateral view of the throttle according to the best mode of carrying out the invention, the throttle in general shown as 1. The throttle 1 consists of a throttle disk 2 with an annular seal face 4 and a bearing 3. The mean line a going all around the seal face 4 has an elliptic shape. More specifically the mean line a forms an ellipse obtained as a taper section through an imaginary cone having the top rake $\beta$, with the perpendicular b to the taper section level forming the angle $\alpha$ to the axis c of the cone.

The torsional axis j of the throttle 1, which axis j is parallel to the level of the mean line a, is dislocated the distance X from said level. More specifically the distance X is chosen so that the straight lines d and e between said torsional axis j (at the symmetry level of the throttle as per FIG. 1) and the points of intersection f and g of the mean line form the angles $90°+\gamma$ and $90°-\gamma$, resp., to the major axis of the ellipse, to the generating line of the envelope surface 4 which in the area of points f and g has a conical shape. More specifically the distance X is chosen so that the angle $\gamma$ is $=\alpha$.

These geometrical conditions imply that the point called $f_1$ in FIG. 1 will describe an arc having a radius which is larger than the radius of the arc described by a point $f_2$ when the throttle is turned around its torsional centre j. On the opposite side of the seal face 4, i.e. in the conical area of point g, the conditions are contrary. Thus the arc generated by point g, has a smaller radius than the circle generated by point $g_2$. These conditions may also be expressed as $jf_2>jf>jf$, and $jg_1>jg>jg_2$ resp.

In the areas of points f and g, i.e. in the areas of the intersecting points between mean line a and its major axis, the seal face 4 has a conical shape. In the areas of the intersecting points h and i of the minor axis with the mean line a the seal face 4 has, however, been given a spherical shape, with the radius R of the sphere corresponds to the distance from points h and i to the centre of the ellipse formed by the mean line a. In the areas between the conical and spherical sections of seal face 4, the conical and spherical shapes successively merge into each other. The shapes of the throttle 1 may be produced by copying a cast workpiece.

In FIGS. 2-4 a valve housing is generally marked with the digital 5. The valve housing 5 forms a circular opening 6 for the medium to be led through the valve, the opening 6 having a somewhat larger diameter than the major axis of the ellipse created by the mean line a on the seal face 4 of the throttle 1. The valve housing 5 is provided with a flange 7 for the connection of an adjusting appliance and with a gland 8 mounted by means of stud bolts. A couple of lugs 10 are provided with holes 11 to make fitting into a piping easier.

A stem 12 carried in a bearing in the valve housing 5 goes through the housing and is tightened on the control side by a stuffing box 13 and on the opposite side by a plug 14. Furthermore, the stem 12 goes through the bearing 3 of the throttle 1. The throttle 1 is fixed to the stem 12 by means of conical rivets 15. The axis of spindle coincides with the torsional axis j of the throttle. A covering plate 16 is fixed to the valve housing 5 by means of screws 17. Between covering plate 16 and valve housing 5 is arranged for a valve seat 18. The valve seat 18 consists of a comparatively flat ring having a rounded inner edge. By "comparatively flat" is understood that the thickness is considerably smaller than the radial extension. The material of the valve seat ring 18 is normally steel or some other alloy, but other comparatively stiff though to a certain extent elastic materials are thinkable, such as certain rigid plastics type PTFE. The valve seat ring 18 is carried in a bearing between a couple of opposite spring washers 19 and 20 which form a groove 21 in which the valve seat is displaceable in the radial direction. Two gaskets have been marked 22 and 23 resp.

The flat ring constituting the valve seat 18 has in its resting position, i.e. when the valve is open, a quite circular shape. When the valve is shut by turning the stem in an anti-clockwise direction around the torsional axis j, FIG. 2 and FIG. 4, the conical parts of the seal face 4 in the areas of points f and g will slide towards the valve seat 18. Since the distance between the torsional axis j and the contact points of the conical parts continuously grow bigger as the throttle is turned in an anti-clockwise direction (cf. $jf_2<jf<jf_1$ and $jg_1<jg<jg_2$), the conical parts of the seal face 4 will draw out the valve seat ring 18 in the direction of the major axis of the mean line a. At the same time the valve seat ring 18 yields inwards in the direction of the minor axis so that the circumference of the valve seat will principally remain constant. Finally the valve seat is pressed against the seal face 4 around the whole of its circumference which occurs when the valve seat 18 concurs with the elliptical shape of the mean line a, which implies that in this position the valve seat 18 is also pressed against the spherical parts of the seal face. Those latter in this position act as spherical slide bearings towards valve seat 18, minimizing the wear and maintaining the flatness of the valve seat. The deformation of the valve seat 18 at the level of the seat is furthermore so inconsiderable that it is well inside the area of elasticity of the material. When the throttle is opened by turning it in a clockwise direction, FIGS. 2 and 4, from the closed position, the valve seat will then recover its circular shape. At the same time the surface contact between the throttle 1 and the seat is released by the valve seat yielding out in the direction of the minor axis and recovers its larger, entirely circular extension in said direction. During the main part of the turning of the throttle from its closed to its open position, and vice versa, the throttle thus is not in contact with the valve seat 18 which is of course very advantageous from a wear point of view.

I claim:

1. Butterfly valve comprising a valve housing having a a valve seat therein, throttle means located in said housing for movement between an open position and a shut-off position, a stem around which the throttle means rotates, seal face means on the throttle means for pressing against the valve seat when the throttle means is in the shut-off position to close the valve against flow of material therethrough, said seal face means defining a plane said seal face means including two opposite, essentially spherical shaped sections intersected by a symmetry plane through the throttle means coinciding with the torsional axis of the throttle means said plane of said seal face means being offset from said torsional axis, the said essentially spherical shaped sections being essentially the shape of a sphere having a radius R which is equal to one-half of the distance between the points of contact of the essentially spherical shaped sections of the seal face means with the valve seat when the throttle is in the shut-off position, said seal face means also including two essentially conically shaped sections on each side of said symmetry plane, said conically shaped sections being portions of a cone having a top rake between 10° and 40° and each essentially conically shaped section being located on said seal face means between said essentially spherically shaped sections, each said essentially spherically shaped section and each said essentially conically shaped section successively merging into each other, said essentially conically shaped sections and said essentially spherically shaped sections being in sealing engagement with a significant portion of said valve seat when said throttle means is in said shut-off position.

2. Butterfly valve according to claim 1, characterized by the torsional axis (j), parallel to the plane determined by the curve (a) going around the circumference of the seal face, being arranged a distance from said plane such that the perpendiculars (d, e) from the intersecting points (f, g), between the preferably essentially elliptically shaped curve (a) and its major axis to the torsional axis (j) form the angles 90°+$\gamma$ and 90°−$\gamma$, resp., to the generating lines of said conical surfaces, with the angle $\gamma$ being essentially equal to the angle $\alpha$ between the center line of the conically shaped surfaces and a perpendicular to the plane formed by the above-mentioned preferably essentially elliptical curve (a).

3. Butterfly valve according to claim 2, characterized by the angle $\gamma$ being between 5° and 8°.

4. Butterfly valve according to one of claims 1, 2, or 3, characterized by the valve seat being made up by a comparatively flat ring (18) arranged so as to be displaceable in radial direction in a groove in the valve housing (5).

5. Butterfly valve according to claim 4, characterized by the said valve seat ring (18) having a circular shape in its resting position.

6. Butterfly valve according to claim 1, wherein the seat (18) is arranged flexibly in its plane so that, when the essentially conical surfaces are pressed against the seat, it can concur with the shape of an oval, preferably essentially elliptically shaped curve (a) going around the circumference of the seal face.

* * * * *